United States Patent
Savoy et al.

(10) Patent No.: US 11,260,447 B2
(45) Date of Patent: Mar. 1, 2022

(54) APPARATUS AND METHOD FOR MECHANICALLY JOINING ADVANCED HIGH STRENGTH STEEL

(71) Applicant: Utica Enterprises, Inc., Troy, MI (US)

(72) Inventors: Mark A. Savoy, Warren, MI (US); Phillip J. I. Morgan, Royal Oak, MI (US)

(73) Assignee: Utica Enterprises, Inc., Troy, MI (US)

( * ) Notice: Subject to any disclaimer, the term of this patent is extended or adjusted under 35 U.S.C. 154(b) by 467 days.

(21) Appl. No.: 16/015,698

(22) Filed: Jun. 22, 2018

(65) Prior Publication Data

US 2018/0297106 A1 Oct. 18, 2018

Related U.S. Application Data

(63) Continuation-in-part of application No. PCT/US2017/014501, filed on Jan. 23, 2017.

(Continued)

(51) Int. Cl.

| | |
|---|---|
| *B23K 26/08* | (2014.01) |
| *B23K 26/20* | (2014.01) |
| *B23K 26/32* | (2014.01) |
| *B21J 15/02* | (2006.01) |
| *B21J 15/10* | (2006.01) |
| *B21J 15/14* | (2006.01) |
| *B23K 1/005* | (2006.01) |
| *B21D 39/03* | (2006.01) |

(Continued)

(52) U.S. Cl.
CPC .......... *B21J 15/025* (2013.01); *B21D 39/031* (2013.01); *B21J 15/08* (2013.01); *B21J 15/10* (2013.01); *B21J 15/142* (2013.01); *B23K 1/0056* (2013.01); *B23K 26/20* (2013.01); *B23K 26/60* (2015.10); *B32B 7/08* (2013.01); *B32B 15/011* (2013.01); *B32B 2250/02* (2013.01)

(58) Field of Classification Search
CPC ........ B23K 26/0093; B23K 26/08–082; B23K 26/20–302; B23K 26/32–323; B21J 15/00–285; B21D 39/00–038
See application file for complete search history.

(56) References Cited

U.S. PATENT DOCUMENTS

| | | |
|---|---|---|
| 4,237,363 A | 12/1980 | Lemelson |
| 5,380,978 A | 1/1995 | Pryor |
| | (Continued) | |

FOREIGN PATENT DOCUMENTS

| | | |
|---|---|---|
| CN | 101495253 A | 7/2009 |
| CN | 102672062 A | 9/2012 |
| | (Continued) | |

OTHER PUBLICATIONS

Extended European Search Report for Application No. 17747921.9, dated Nov. 26, 2019, 10 pages.

(Continued)

*Primary Examiner* — Michael A Laflame, Jr.
(74) *Attorney, Agent, or Firm* — Brooks Kushman P.C.

(57) ABSTRACT

Apparatus (20, 22) and a method for mechanically joining a steel sheet portion (28 or 32) of advanced high strength steel to a metallic sheet portion (30 or 34) is performed to a light-safe extent by a detector assembly (106) during the mechanical joining that may be clinching, clinch riveting, full-punch riveting or self-piercing riveting.

19 Claims, 6 Drawing Sheets

Related U.S. Application Data

(60) Provisional application No. 62/405,288, filed on Oct. 7, 2016, provisional application No. 62/400,809, filed on Sep. 28, 2016, provisional application No. 62/290,608, filed on Feb. 3, 2016.

(51) Int. Cl.
  *B21J 15/08* (2006.01)
  *B23K 26/60* (2014.01)
  *B32B 7/08* (2019.01)
  *B32B 15/01* (2006.01)

(56) References Cited

U.S. PATENT DOCUMENTS

| | | | |
|---|---|---|---|
| 5,533,146 | A | 7/1996 | Iwai |
| 5,752,305 | A | 5/1998 | Cotterill et al. |
| 6,417,490 | B1 | 7/2002 | Liebrecht et al. |
| 6,684,479 | B2 | 2/2004 | Wang et al. |
| 6,742,235 | B2 | 6/2004 | Blacket et al. |
| 6,769,595 | B2 | 8/2004 | Stol et al. |
| 6,836,948 | B2 | 1/2005 | Wang |
| 7,267,736 | B2 | 9/2007 | Hou et al. |
| 8,234,770 | B2 | 8/2012 | Durandet et al. |
| 8,283,601 | B2 | 10/2012 | Jin |
| 8,723,078 | B2 | 5/2014 | Mazumder et al. |
| 8,898,880 | B2 | 12/2014 | Trinick |
| 9,259,774 | B2 | 2/2016 | Carter |
| 10,406,592 | B2 | 9/2019 | Blacket et al. |
| 2002/0125297 | A1 | 9/2002 | Stol et al. |
| 2003/0037428 | A1 | 2/2003 | Wang et al. |
| 2003/0167621 | A1 | 9/2003 | Wang et al. |
| 2004/0134968 | A1 | 7/2004 | Opper |
| 2012/0103946 | A1* | 5/2012 | Krink ............ B23K 26/38 219/121.39 |
| 2013/0087538 | A1 | 4/2013 | Walter et al. |
| 2013/0193121 | A1 | 8/2013 | Alber |
| 2015/0219521 | A1* | 8/2015 | Clew ............ B23Q 17/006 72/31.01 |
| 2016/0138636 | A1 | 5/2016 | Noe et al. |
| 2016/0263641 | A1 | 9/2016 | Savoy et al. |
| 2018/0169962 | A1 | 6/2018 | Shriver et al. |
| 2018/0185902 | A1 | 7/2018 | Furusako et al. |
| 2018/0185903 | A1 | 7/2018 | Furusako et al. |
| 2018/0185904 | A1 | 7/2018 | Jang et al. |

FOREIGN PATENT DOCUMENTS

| | | |
|---|---|---|
| CN | 103600016 A | 2/2014 |
| CN | 103658416 A | 3/2014 |
| CN | 103990756 A | 8/2014 |
| DE | 19630488 C2 | 7/1999 |
| DE | 19800035 A1 | 7/1999 |
| DE | 20013526 U1 | 12/2000 |
| DE | 102004062896 A1 | 5/2006 |
| DE | 112007001331 T5 | 7/2009 |
| EP | 0744232 B1 | 6/2003 |
| JP | S62105736 U | 7/1987 |
| JP | S62179882 A | 8/1987 |
| JP | H08318339 A | 12/1996 |
| JP | H10117020 A | 5/1998 |
| JP | 2000511470 A | 9/2000 |
| JP | 2005342739 A | 12/2005 |
| JP | 2006007266 A | 1/2006 |
| JP | 2006043769 A | 2/2006 |
| JP | 2009538738 A | 11/2009 |
| WO | 2007137367 A1 | 12/2007 |
| WO | 2007122688 A1 | 8/2009 |
| WO | 2020093143 A1 | 5/2020 |

OTHER PUBLICATIONS

India First Examination Report for Application No. 201837027812, dated Oct. 28, 2020, 5 pages.

Chinese Office Action with English translation for Application No. 201780009849.7, dated Aug. 17, 2020, 15 pages.

International Search Report and Written Opinion for Application No. PCT/US2017/014501, dated Apr. 6, 2017, 7 pages.

Chinese Office Action for Application No. 201780009849.7, dated Jan. 2, 2020, 8 pages.

Japanese Office Action and English translation for Application No. 2018-538627, dated Mar. 1, 2021, 11 pages.

* cited by examiner

APPARATUS AND METHOD FOR MECHANICALLY JOINING ADVANCED HIGH STRENGTH STEEL

CROSS-REFERENCE TO RELATED APPLICATIONS

This application is a continuation-in-part of International Patent Application PCT/US2017/014501, filed under the Patent Cooperation Treaty on Jan. 23, 2017 by Mark A. Savoy and Phillip J. I. Morgan under the title APPARATUS AND METHOD FOR MECHANICALLY JOINING ADVANCED HIGH STRENGTH STEEL, which published on Aug. 10, 2017 as WO 2017/136169 A1; which in turn claims the benefit of: U.S. Provisional application Ser. No. 62/405,288, filed on Oct. 7, 2016 by Mark A. Savoy and Phillip J. I. Morgan under the title APPARATUS AND METHOD FOR MECHANICALLY JOINING ADVANCED HIGH STRENGTH STEEL; U.S. Provisional application Ser. No. 62/400,809, filed on Sep. 28, 2016 by Mark A. Savoy and Phillip J. I. Morgan under the title APPARATUS AND METHOD FOR MECHANICALLY JOINING ADVANCED HIGH STRENGTH STEEL; and U.S. Provisional application Ser. No. 62/290,608 filed on Feb. 3, 2016 by Mark A. Savoy and Phillip J. I. Morgan under the title APPARATUS AND METHOD FOR CLINCHING ADVANCE HIGH STRENGTH STEEL; the entire disclosures of each of said patent applications are hereby incorporated by reference.

TECHNICAL FIELD

This invention relates to an apparatus and method for mechanically joining advanced high strength steel using laser heating in a light-safe manner.

BACKGROUND

As disclosed by U.S. Pat. No. 8,234,770 Durandet et al., lasers have previously been used for joining metals, such as magnesium and/or aluminum, using self-piercing rivets with preheating. Durandet et al. also discloses that the mechanical fastening method may be suitable for a clinching-type process or a press-joining process.

When lasers are utilized, work must be carried out in a light-safe manner so that no undue amount of scattered radiation from an intense laser beam causes damage. Previously such processing has been performed in an enclosed processing station that is secured against operator access during use so there is no exposure of operators to laser emissions.

SUMMARY

An object of the present invention is to provide improved apparatus for mechanically joining a first steel sheet portion of advanced high strength steel (hereafter also referred to as AHSS) to a second metallic sheet portion using light-safe laser heating.

In carryout out the above object, apparatus according to the invention includes a joining assembly adjacent which is positioned a first sheet portion of AHSS that is contacted with a second sheet portion of metal at an interface of the sheet portions. The joining assembly includes a housing defining a light-safe chamber having an opening and also includes an indexing member mounted on the housing for movement parallel to the interface of the sheet portions between a heating position and a joining position. The indexing member includes an opening and a location for mounting a die spaced from its opening. In the heating position of the indexing member its opening is in alignment with the opening of the housing and in alignment with a joining location of the first and second sheet portions. The indexing member is aligned with the joining location of the sheet portions in the joining position of the indexing member. An actuator moves the indexing member of the joining assembly parallel to the interface of the first and second sheet portions between its heating and joining positions. A laser assembly of the joining assembly includes a laser collimator for firing a laser beam from within the housing chamber through the opening of the housing and the opening of the indexing member in its heating position to provide heating of the first sheet portion of advanced high strength steel at the joining location. After the heating the actuator moves the indexing member parallel to the interface of the first and second sheet portions to the joining position. A detector assembly of the apparatus only permits firing of the laser assembly when the first sheet portion of AHSS is in light-safe contact with the indexing member in its heating position. A clinch punch or rivet ram of the assembly cooperates with the die in the joining position of the indexing member to mechanically join the heated first sheet portion of AHSS and the second metal sheet portion to each other at the joining location. A controller of the apparatus is configured to operate the joining assembly, the actuator, the laser assembly, and the clinch punch or the rivet ram for the joining operation of the sheet portions.

As disclosed, the joining assembly includes a pivotal connection that mounts the indexing member on the housing for pivoting movement between the heating and joining positions or alternatively includes a slideway that mounts the indexing member on the housing for rectilinear movement between the heating and joining positions.

As also disclosed, the die is: a clinch die for providing a clinch joint; a clinch-rivet die for providing a clinch-rivet joint; a full-punch rivet die for providing a full-punch rivet joint; or a self-piercing rivet die for providing a self-piercing rivet joint.

The detector assembly as disclosed includes a source of pressurized gas for providing pressurized gas to the chamber of the housing and also including a detector for detecting gas flow from the source to the chamber to detect whether the first sheet portion is in light-safe contact with the indexing member in the heating position for the heating.

The joining assembly as disclosed may include a temperature sensor for sensing the temperature of the first sheet portion at the joining location through the opening of the indexing member and also may control the laser heating by operation of the controller.

In one disclosed embodiment, the apparatus includes a parallel kinematic machine (PKM) operated by the controller and including: a first support; a tripod having three extendable and retractable struts mounted on and extending away from the first support in a converging manner toward each other; a second support mounted by the three struts spaced from the first support to mount the clinch punch or the rivet ram that cooperates with the die under operation of the controller to provide the joining that connects the sheet portions to each other; and rails that mount the PKM for movement in horizontal directions that are perpendicular to each other.

Another disclosed embodiment of the apparatus includes a C frame having one end that supports the joining assembly and having another end that supports the clinch punch or the rivet ram that cooperates with the die under operation of the controller to provide the joining of the first and second sheet portions to each other; and a robot of the apparatus moves the C frame under operation of the controller to provide the joining at different positions of the first and second sheet portions.

Another object of the invention provides an improved method for mechanically joining advanced high strength steel in a light-safe manner.

In carrying out the immediately preceding object, the method of the invention is performed by positioning adjacent a joining assembly a first sheet portion of advanced high strength steel that is contacted with a second sheet portion of metal at an interface of the sheet portions, with the joining assembly including a housing having an opening and defining a light-safe chamber and the joining assembly also including an indexing member mounted on the housing for movement parallel to the interface of the sheet portions between a heating position and a joining position, and with the indexing member including an opening positioned in the heating position in alignment with the opening of the housing and in alignment with a joining location of the first and second sheet portions, and with the indexing member including a die that is located when the indexing member is in the joining position in alignment with the joining location of the sheet portions. A laser beam is fired from within the housing chamber through the opening of the housing and the opening of the indexing member in its heating position to provide heating of the first sheet portion of advanced high strength steel at the joining location. After the heating, the indexing member is moved parallel to the interface of the first and second sheet portions to the joining position. Light-safe contact of the first sheet portion with the indexing member while in the heating position is detected to only then permit the firing of the laser beam. A clinch punch or a rivet ram is operated to cooperate with the die in the joining position of the indexing member to mechanically join the heated first sheet portion of advanced high strength steel and the second metal sheet portion to each other at the joining location. A controller used is configured to control positioning of the joining assembly, projection of the light-safe laser beam, detection of the light-safe contact of the first sheet portion of advanced high strength steel with the indexing member, and operation of the clinch punch or the rivet ram.

As disclosed, the indexing member is either pivotally moved or moved in a rectilinear manner between the heating and joining positions.

As also disclosed, the joining provides a clinch joint; a clinch-rivet joint; a full-punch rivet joint; or a self-piercing rivet joint.

Flow of pressurized gas from the light-safe chamber is sensed as disclosed to control firing of the laser beam.

As further disclosed, the temperature of the sheet portion of advanced high strength steel is sensed at the joining location.

In one practice of the method, a parallel kinematic machine (PKM) operated by the controller mounts and moves the clinch punch or the rivet ram that cooperates with the die to provide the joining that connects the sheet portions to each other, and the PKM is moved on rails that are perpendicular to each other.

In another practice of the method, opposite ends of a C frame mount the joining assembly and the clinch punch or the rivet ram that provide the joining operation, and the C frame is supported and moved by a robot.

According to another disclosed embodiment, a light safe housing is provided with an enclosure. The enclosure has an opening. The opening is defined as a work location. Means are provided for generating and actuating a coherent beam of light and directing said beam onto said work location. A source of pressurized gas is attached to said enclosure. The source of pressurized gas delivers airflow through said opening of said enclosure. Means are provided for sensing the rate of gas flow through said opening of said enclosure. An indexing member is movably attached to said enclosure. The indexing member has a first opening that aligns with said opening of said enclosure when said indexing member moves to a first position. The first position is also said work location. The indexing member further has a second opening spaced from said first opening. A die is securely mounted in said second opening of said indexing member. Means are provided for shuttling said index member from said first position at said work location, to a second position. The second position aligns said second opening of said indexing member with said opening of said enclosure at said work location. Means are provided for covering said first opening of said indexing member such that upon sensing of a pre-determined air flow through said opening of said enclosure, said generating and actuating means fires and directs said coherent beam of light onto said work location.

According to another object, the means for covering includes a sheet of advanced high strength steel.

According to another embodiment, a method is provided for joining metal sheet plates. A first sheet of advanced strength steel is disposed on a surface. A second sheet of metal is disposed on said first sheet of advanced strength steel such that said second sheet of metal is overlapping said first advance high strength steel sheet. A laser beam irradiates at a predetermined inclination angle onto the first sheet of advanced high strength steel of the overlapped first and second metal sheet. The second sheet of metal engages with a mechanical tool to join said first metal sheet of advanced high strength steel to said second sheet of metal.

According to a further object, the method clamps the second sheet of metal to said first sheet of advanced high strength steel using the tool.

According to an even further object, the step of clamping occurs simultaneously with the step of engaging.

According to another object, the laser beam is incident on a side opposite to the side from which the mechanical tool is driven into the said second sheet of metal and said first sheet of advance high strength steel.

According to another object, the step of clamping occurs after said mechanical tool engages said second sheet of metal.

According to another object, the second sheet of metal comprises a dissimilar sheet of metal being joined.

According to another embodiment, an assembly is provided with at least one sheet of advanced high strength steel (AHSS). A metallic component is mechanically interlocked with the AHSS sheet. The AHSS sheet has a ductility and plasticity within the interlock that is generally equivalent to the AHSS sheet outside of the interlock.

According to an object, the interlock includes a clinch joint.

According to another object, the interlock includes a rivet joint.

According to a further object, the rivet joint includes a self-piercing rivet.

According to a further object, the metallic component includes at least one metallic sheet.

According to another object, the at least one sheet of AHSS has a tensile strength of at least 980 Megapascal.

According to another object, the at least one sheet of AHSS has a tensile strength of at least 2,000 Megapascal.

According to another embodiment, an assembly is formed by a process by providing at least one sheet of advanced high strength steel (AHSS). A metallic component is provided. A joining position of the AHSS sheet and the metallic component is heated. The AHSS sheet is mechanically interlocked to the metallic component at the heated joining position. The assembly is cooled whereby the AHSS sheet has a ductility and plasticity within the interlock that is generally equivalent to the AHSS sheet outside of the interlock.

According to an object, the process heats an attachment point of the AHSS sheet and the metallic component to at least 500 degrees Celsius.

According to another object, the process heats an attachment point of the AHSS sheet and the metallic component to at least 700 degrees Celsius.

The objects, features and advantages of the present invention are readily apparent from the following detailed description of the preferred embodiments when taken in connection with the referenced drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
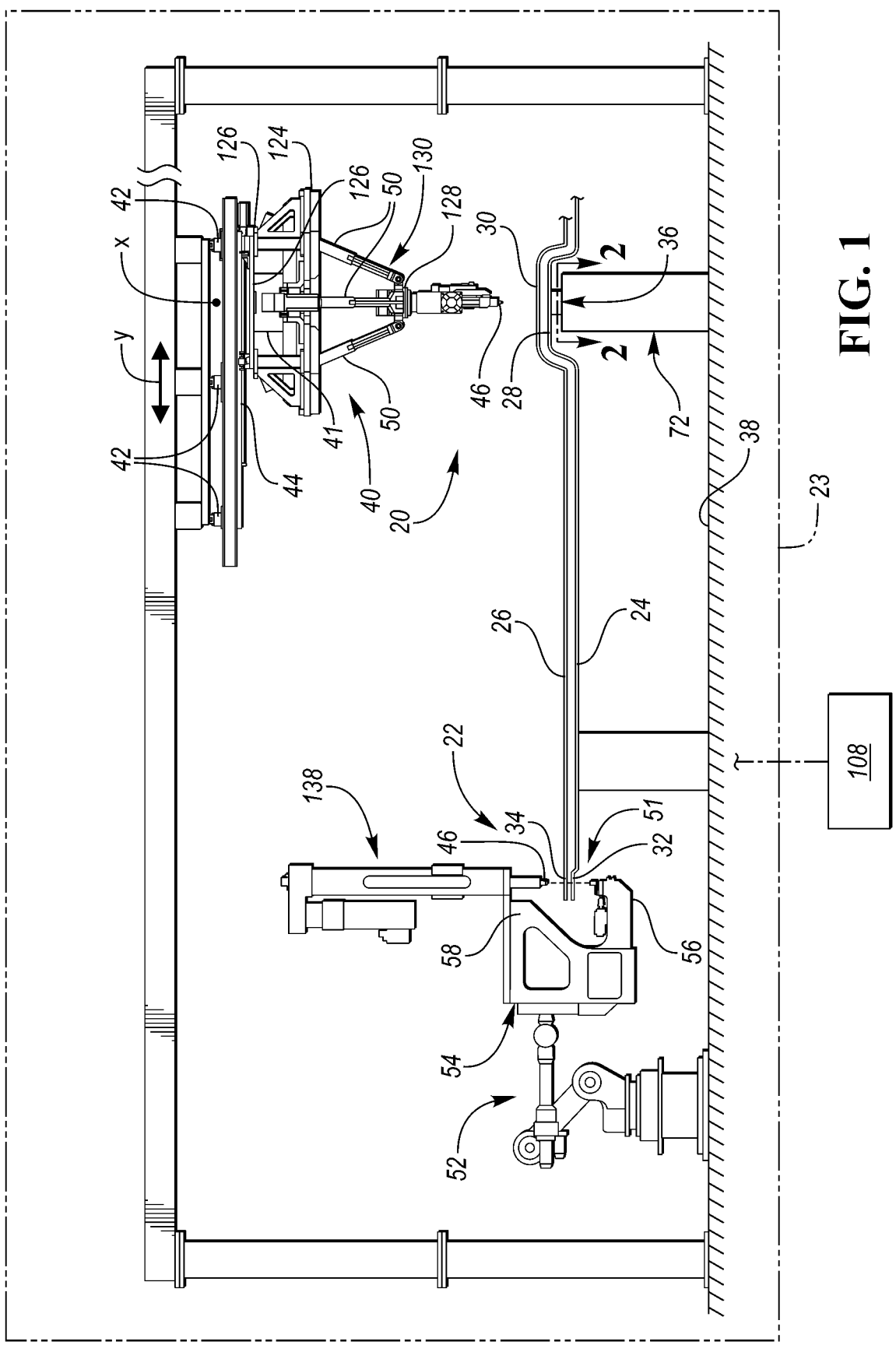
FIG. 1 is a somewhat schematic elevation view of two different embodiments of apparatus constructed according to the invention for performing a mechanical joining method of the invention in different ways.

With reference to FIG. 1, two embodiments of apparatus 20 and 22 constructed according to the invention are illustrated for providing a method of the invention for laser heating for mechanical joining advanced high strength steel. Both the apparatus and method of the invention will be described below in an integrated manner to facilitate an understanding of different aspects of the invention. Also, the AHSS joined has a tensile strength of 700 Megapascal up to 1500 Megapascal or more. Another suitable range is AHSS with a tensile strength of 980 Megapascal to 2000 Megapascal. As such, advanced high strength steels have particular utility for use in vehicle body manufacturing such as with underbody components by providing high strength with a relatively thin gauge and thus lightweight construction that enhances vehicle fuel efficiency while still having structural strength. However, such advanced high strength steels are hard and not sufficiently ductile so as to be capable to be formed for mechanical joining.

The two embodiments of laser heating apparatus 20 and 22 shown in FIG. 1 are within a light-safe work station 23 that can be controlled so no operation of the laser heating can be performed unless human access thereto is prevented. However, the work station can also be configured so human access thereto during the laser heating can be permitted as is hereinafter described. The laser heating is performed to provide mechanical joining of an AHSS piece 24 and a metal piece 26 that have an interface 27 (FIG. 4) and are respectively lower and upper underbody components as shown, but may also be other vehicle body components as well as other metallic structures. More specifically, the AHSS piece 24 and metallic piece 26 respectively have a first sheet portion 28 and a second sheet portion 30 that are joined by the apparatus 20. The AHSS piece 24 and metallic piece 26 also have a first sheet portion 32 and a second sheet portion 34 that are joined by the apparatus 22. The AHSS sheet portions 28 and 32 are directly heated by laser heating so as to be more ductile to permit the mechanical joining. The metal piece 26 may also be made of advanced high strength steel or another metal, such as less hard steel, aluminum, etc., and its sheet portions 30 and 34 may or may not be also heated by the laser heating and/or conduction heating from the sheet AHSS portions 28 and 32 of steel piece 24 so as to be more ductile for the mechanical joining.

With continuing reference to FIG. 1, the laser joining apparatus 20 includes a joining assembly 36 mounted on a horizontal support 38 such as the factory floor. Laser heating provided by the apparatus 20 heats the AHSS sheet portion 28 to facilitate the joining operation as is hereinafter more fully described. Apparatus 20 also includes a parallel kinematic machine (referred to as a PKM) 40 that is mounted by a schematically illustrated riser 41 on horizontal rails 42 and 44 that extend in perpendicular directions to each other. The PKM 40 supports a clinch punch or rivet ram 46 that cooperates with a die 48 (FIGS. 2 and 3) of the joining assembly 36 to provide the joining. More specifically, the PKM 40 is movable in horizontal directions perpendicular to each other along the rails 42 and 44 to different work locations while the operation of struts 50 of the PKM by extension and retraction as is hereinafter more fully described moves the clinch punch or rivet ram 46 to different locations and orientations within each work zone.

With continuing reference to FIG. 1, the laser joining apparatus 22 includes a joining assembly indicated by 51 and is supported by a robot 52 for movement to provide joining at different locations. As shown, the apparatus 22 includes a C frame 54 having one end 56 supporting the joining assembly 51 from which a laser beam is provided in a light-safe manner to provide heating of the sheet portion 32 of the steel piece 24 made of AHSS, and the C frame 54 has another end 58 that supports a punch or rivet ram 46. Joining assembly 51 on the end 56 of the C frame 54 includes the die 48 (FIGS. 13A, B, C and 14-16) that cooperates with the clinch punch or rivet ram 46 to provide the mechanical joining.

Figure 13A:
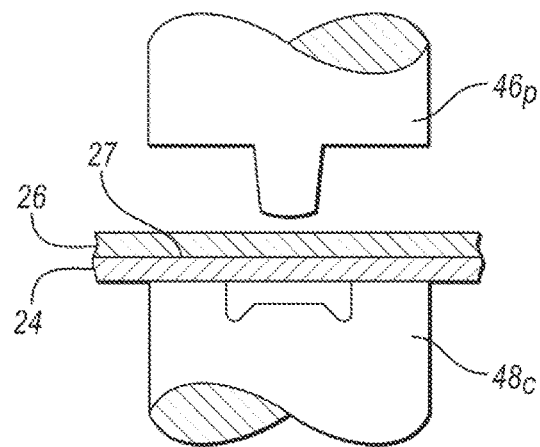
FIG. 13A is a partial view of the apparatus in preparation for clinching of a first sheet portion of advanced high strength steel and a second sheet portion of metal in preparation for their mechanical joining.
Figure 13B:
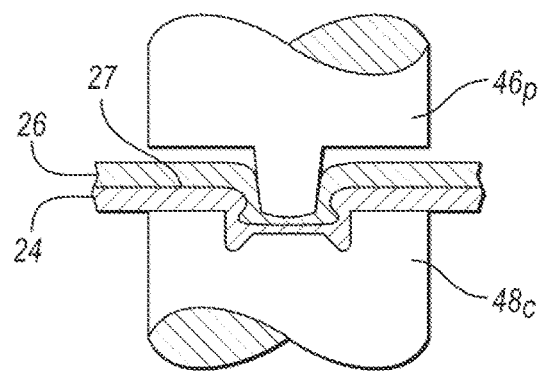
FIG. 13B is an intermediate stage of the joining after initial downward movement of the punch to perform the clinching of the sheet portions to each other.
Figure 13C:
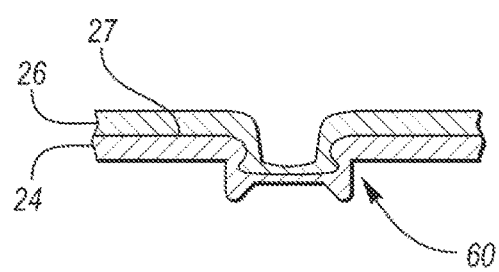
FIG. 13C shows the completion of the clinching of the sheet portions to each other by the downward punch movement prior to upward movement of the punch for another cycle.

As illustrated in the progression of FIGS. 13A, 13B and 13C, the clinch punch $46_p$ and a clinch die $48_c$ of each embodiment of the apparatus 20 and 22 cooperate with each other to provide a clinch joint 60 as shown in FIG. 13C for joining the first and second sheet portions of the steel pieces 24 and 26 to each other.

Figure 14:
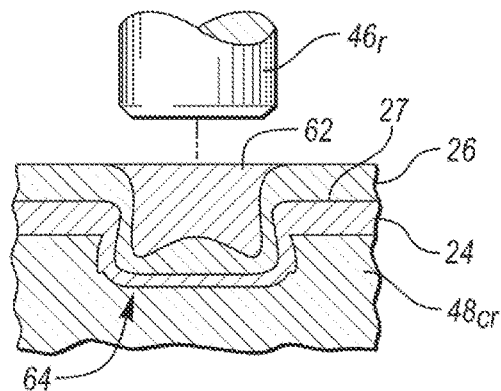
FIG. 14 is a view similar to FIG. 13C showing the sheet portions after clinching by a clinch-rivet die and a clinch rivet moved by a rivet ram.

With reference to FIG. 14, a clinch-rivet die $48_c$, and a clinch rivet 62 under the operation of rivet ram $46_r$ provide a clinch-rivet joint 64 of the AHSS piece 24 and the metal piece 26 to each other.

Figure 15:
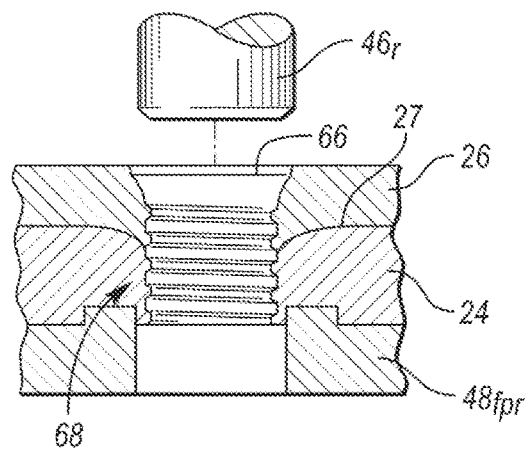
FIG. 15 is a view similar to FIG. 14 showing the sheet portions after mechanical joining of the sheet portions by a full punch rivet die and a full punch rivet moved by a rivet ram.

With reference to FIG. 15, a full-punch rivet die $48_{fpr}$ and a full-piercing rivet 66 provide a full-punch rivet operation that provides a full-punch rivet joint 68. In this embodiment, a punched out piece drops below the die $48_{fpr}$ by driving of the rivet 66 with the rivet ram $46_r$.

Figure 16:
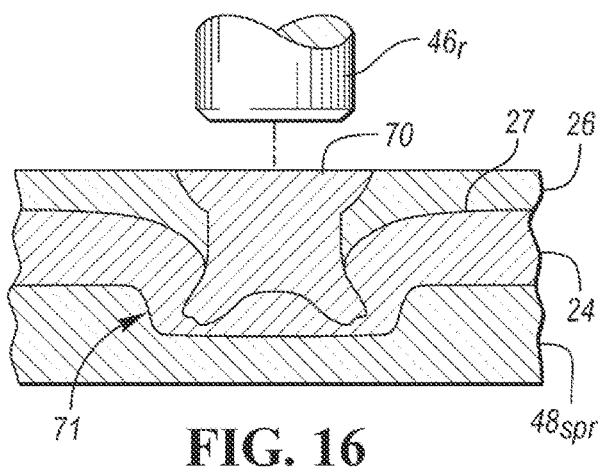
FIG. 16 is a view similar to FIGS. 14 and 15 showing the sheet portions after mechanical joining to each other by a self-piercing rivet moved by a rivet ram and backed up by a self-piercing rivet die.

With reference to FIG. 16, a self-piercing rivet die $48_{spr}$ and a self-piercing rivet 70 driven by rivet ram $46_r$ provide a self-piercing rivet joint 71 between the sheet portions 24 and 26.

Light-safe limits of lasers can vary according to parameters of the Federal Drug Administration, and the United States Occupational Safety & Health Administration of the Department of Labor in its Technical Manual Section III: Chapter 6. Specifically, nonbeam hazards, biological effects and laser hazard classifications can vary for any specific operation as determined by specified investigation guidelines and control measures. Laser heating of AHSS for the mechanical joining as described above utilizes a Class IV laser beam that must be light-safe from human exposure. Both the apparatus 20 and 22 are Class I laser-safe in performing the heating as described below.

Figure 4:
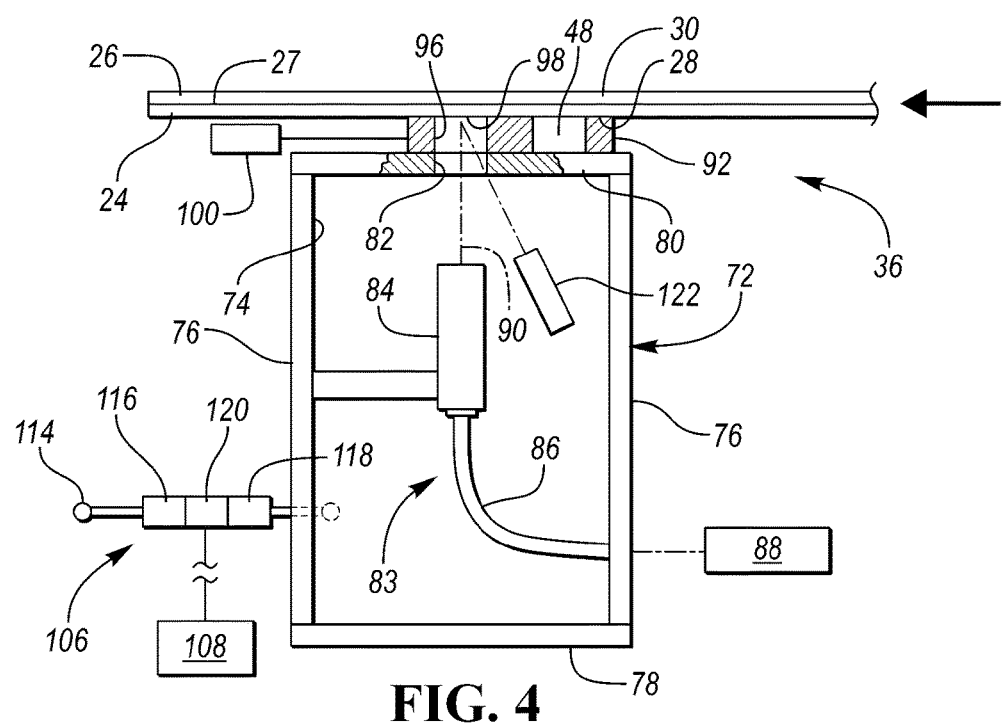
FIG. 4 is an elevation view taken partially in section along the direction of line 4-4 in FIG. 2 and showing the manner in which the laser heating is performed in a light-safe manner in preparation for the joining.

With reference to FIG. 4, the joining assembly 36 of apparatus 20 includes a housing 72 that has a light-safe chamber 74 defined by vertical walls 76, a floor 78 and a ceiling 80 that has an opening 82 at the upper extremity of the chamber 74. A laser assembly 83 of the joining assembly 36 includes a laser collimator 84 that is located within the chamber 74 and receives a laser through a cable 86 from a laser generator 88, concentrates the laser as a beam 90, and fires the laser beam upwardly for projection through the housing opening 82.

Figure 5:
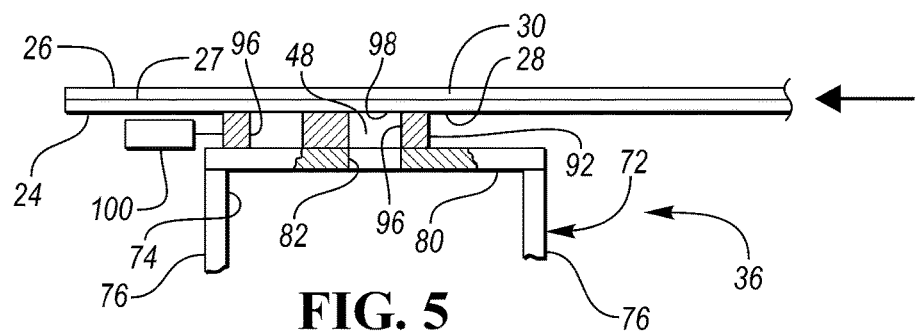
FIG. 5 is a partial sectional view taken along the direction of line 5-5 in FIG. 3 to show the positioning of the indexing member during the joining operation.

With continuing reference to FIG. 4, joining assembly 36 also includes an indexing member 92 mounted, in this embodiment, by a pivotal connection 94 (FIGS. 2 and 3) on the ceiling 80 of housing 72 for movement parallel to the interface 27 of the AHSS piece 24 and the metal piece 26. The movement is between a heating position shown in FIG. 2 and a joining position shown in FIG. 3. The indexing member 92 has an opening 96 positioned in alignment with the opening 82 of the housing 72 in its ceiling 80 and in alignment with a joining location 98 of the first and second sheet portions of metallic pieces 24 and 26 when the indexing member is in the heating position for heating by the laser beam 90. Furthermore, the indexing member 92 has a location spaced from the opening 96 that mounts the previously mentioned die 48 as shown in FIG. 5 in alignment with the joining location 98 of the sheet portions in the joining position of the indexing member.

As shown in FIGS. 2-5, an actuator 100 moves the indexing member 92 of the joining assembly 36 parallel to the interface 27 of the first and second sheet portions between its heating and joining positions respectively shown in FIGS. 2, 4 and FIGS. 3, 5.

Thus, the laser assembly 83 shown in FIG. 4 fires the laser beam 90 upwardly through the housing opening 82 and the opening 96 of the indexing member 92 in its heating position to provide heating of the sheet portion of the AHSS piece 24 at the joining location 98 so it becomes more ductile to permit the mechanical joining operation of any one of the types previously described. After the heating, the actuator 100 moves the indexing member 92 parallel to the interface of the sheet portions of the metallic pieces 24 and 26 to the joining position of FIG. 5 for the joining operation. This heating and indexing to the joining position can be done quickly so there is minimal temperature loss that reduces the temperature to which the heating must be done to provide the advanced high strength steel with sufficient ductility for the mechanical joining.

As shown in FIG. 4, a detector assembly 106 only permits operation of the laser assembly 83 when the sheet portion of the AHSS piece 24 is in light-safe contact with the indexing member 92. Thus, the laser beam 90 is always sufficiently contained at or below allowable accessible emission limits outward of the joining assembly 36 so that operation and/or maintenance can be performed by a human operator during the laser heating.

The PKM 40 shown in FIG. 1 supports the clinch punch or rivet ram 46 as previously described in connection with FIGS. 13A, 13B, 13C, 14, 15 and 16 for cooperating with the associated die 48 to mechanically join the heated AHSS first sheet portion and the second metal sheet portion to each other at the joining location of the indexing member where the heating provides the ductility needed to permit the metal movement for the joining.

Figures 2, 3:
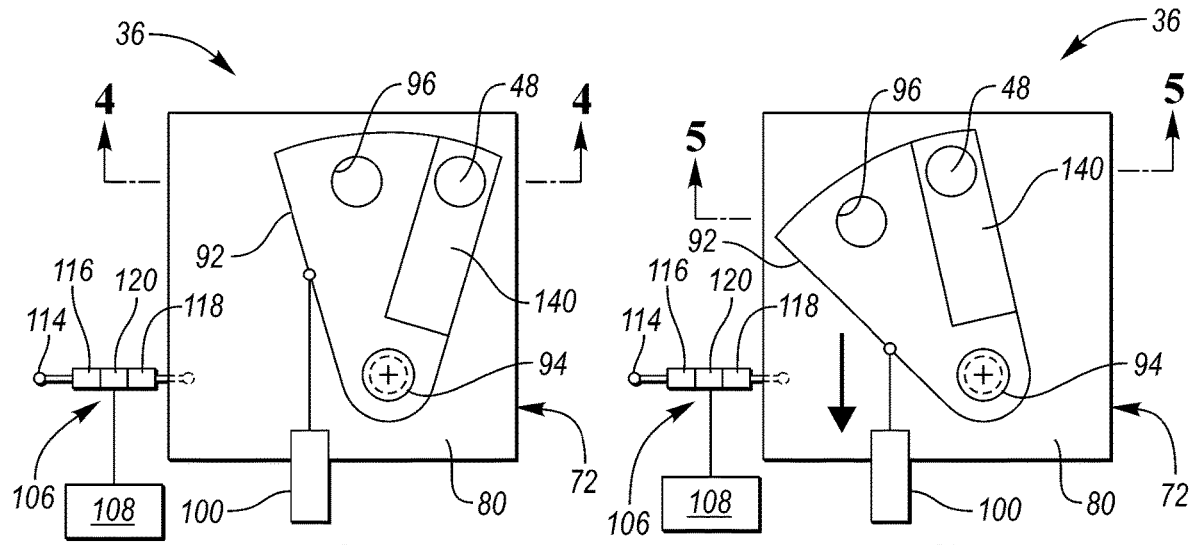
FIG. 2 is a top plan view of a joining assembly of one embodiment of the apparatus taken along the direction of line 2-2 in FIG. 1 and showing an indexing member of the joining assembly in a heating position.
FIG. 3 is a top plan view similar to FIG. 2 but after laser heating and showing the indexing member pivotally moved to a joining position for the mechanical joining operation.

A controller 108 shown in FIG. 1 operates, as shown in FIGS. 2-4, the joining assembly 36, actuator 100, laser assembly 83, the detector assembly 106, and the clinch punch or rivet ram 46 shown in FIG. 1 as well as operating any other necessary components of the apparatus for the joining.

As previously mentioned in connection with the embodiment of FIGS. 2-5, this embodiment of the joining assembly 36 includes the pivotal connection 94 that mounts the indexing member 92 on the housing 72 for pivoting movement between the heating position shown in FIGS. 2 and 4 and the joining position shown in FIGS. 3 and 5.

Figure 6:
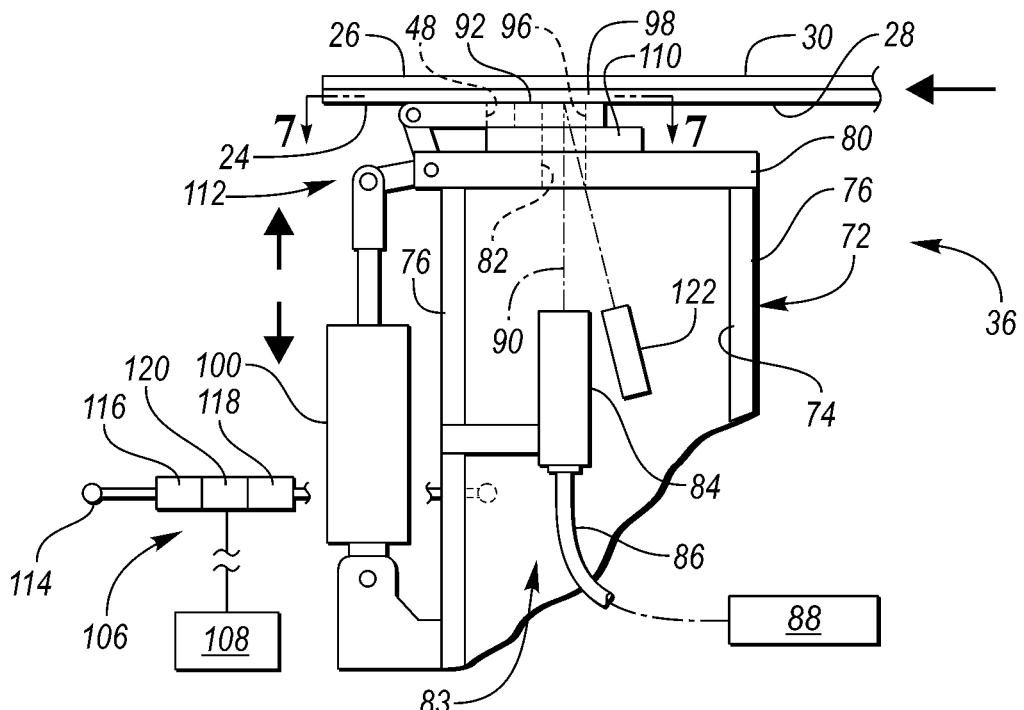
FIG. 6 is an elevation view of another embodiment of the joining assembly and is generally the same as FIG. 4 showing the manner in which laser heating takes place in a light-safe manner in preparation for the joining operation.
Figure 7:
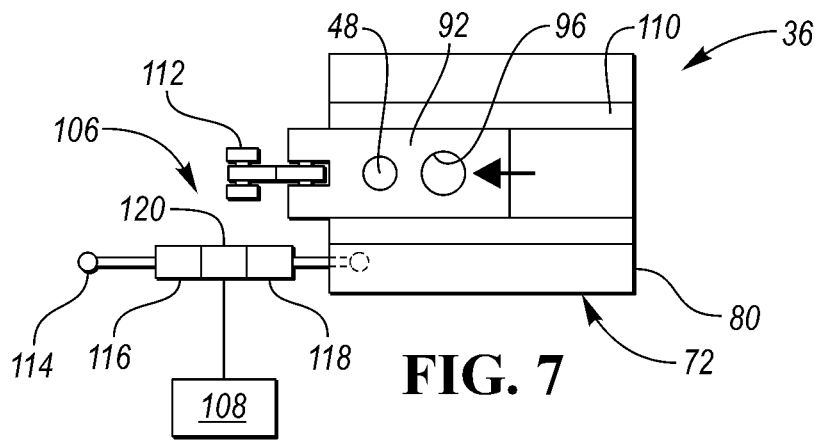
FIG. 7 is a top plan view taken along the direction of line 7-7 in FIG. 6 to illustrate the indexing member positioned during the laser heating.
Figure 8:
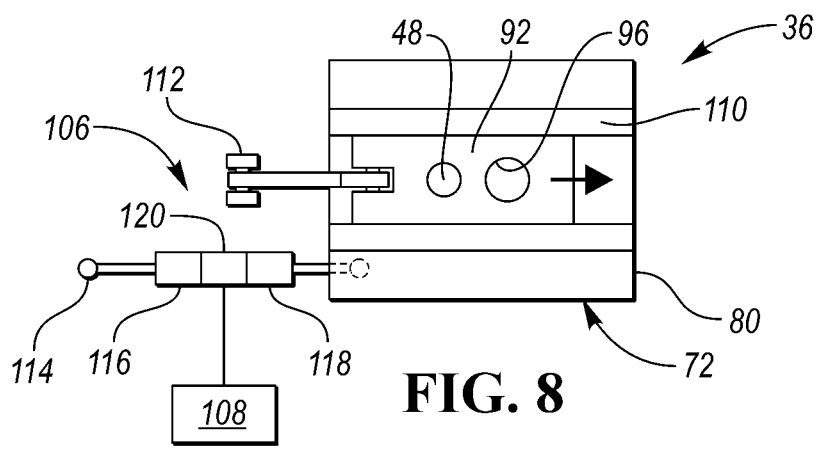
FIG. 8 is a top plan view like FIG. 7 but after the laser heating showing the indexing member moved rectilinearly to the joining position in preparation for the mechanical joining.

Another embodiment of the joining assembly 36 illustrated in FIGS. 6-8 includes a slideway 110 that mounts the indexing member 92 on the housing 72 for rectilinear movement between the heating position of FIG. 7 and the joining position of FIG. 8 under the control of the actuator 100. In each embodiment, the actuator 100 is a cylinder that extends and retracts to provide the indexing member movement with the embodiment of FIGS. 6-8 having a linkage 112 that provides the connection of the actuator to the indexing member.

As illustrated in FIGS. 4 and 6, each of the embodiments of the joining assembly 36 has its detection assembly 106 including a source of pressurized gas 114 for providing pressurized gas to the chamber 74 of the joining assembly housing 72. The detection assembly 106 also includes sensors 116 and 118 between which a detector 120 is located to detect sufficient gas movement between the sensors which is indicative of a lack of light-safe sealing of the indexing member opening 96 by the sheet portion of AHSS piece 24 in order to provide a signal to the controller 108 that prevents the laser assembly 83 from firing the laser beam 90 when the laser operation would not be light safe.

As also shown in FIGS. 4 and 6, each embodiment of the joining assembly 36 includes a temperature sensor 122 for sensing the temperature of the sheet portion of the metallic piece 24 at the joining location 98 through the opening 96 of the indexing member. It is also possible in response to this temperature sensing to control the laser heating through operation of the controller 108 to which the temperature sensor 122 is connected.

With reference to FIG. 1, the previously mentioned PKM 40 includes the riser 41 that connects a first support 124 thereof to a carriage 126 that is supported for movement in perpendicular directions by the perpendicular rails 42 and 44 to a selected position under operation of the controller 108. The previously mentioned extendable and retractable struts 50 extend from the first support 124 to a second support 128 to provide a tripod 130 with the second support mounting the punch or rivet ram 46 for rotation and angular positioning that permits the operation at any required orientation in cooperation with the joining assembly 51 as previously described. The struts 50 may be extendable and retractable in any suitable manner such as disclosed by United States patent application Publication No. 2016/0263641, published on Sep. 15, 2016 by Mark A. Savoy and Phillip J. I. Morgan under the title WORK STATION AND METHOD FOR JOINING METALLIC SHEETS, the entire disclosure of which is hereby incorporated by reference. More specifically, the struts 50 may each be embodied by a roller screw having: an upper end pivotally connected to the first support 124 of the PKM and a lower end pivotally connected to the second support 128, an elongated screw, a nut including a planet carrier and a plurality of threaded rollers rotatable on the planet carrier and meshed with the screw such that relative rotation between the screw and the nut changes the length of the strut.

With reference to FIGS. 1 and 9-12 the other embodiment of the apparatus 22 is supported for movement by the robot 52 instead of a PKM but has many of the same components, except as will be mentioned, that operate the same way as the PKM embodiment and thus have like reference numerals applied thereto so that much of the prior description is also applicable and will not be repeated.

Figures 9, 10:
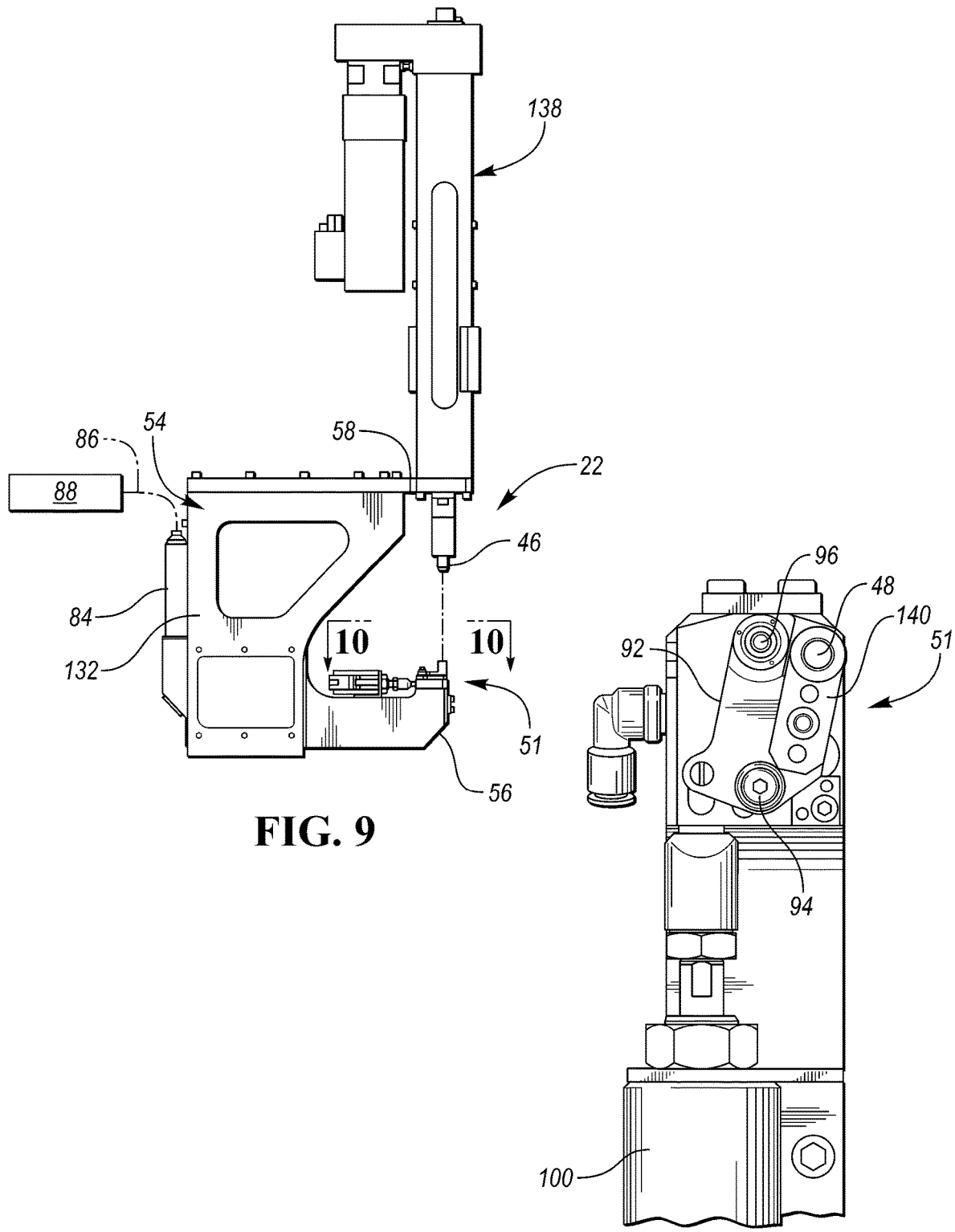
FIG. 9 is an elevation view of another embodiment of the apparatus constructed according to the invention to provide the mechanical joining method of advanced high strength steel in a light-safe manner.
FIG. 10 is a plan view taken along the direction of line 10-10 in FIG. 9 to show the joining assembly of the apparatus in its heating position.
Figure 11:
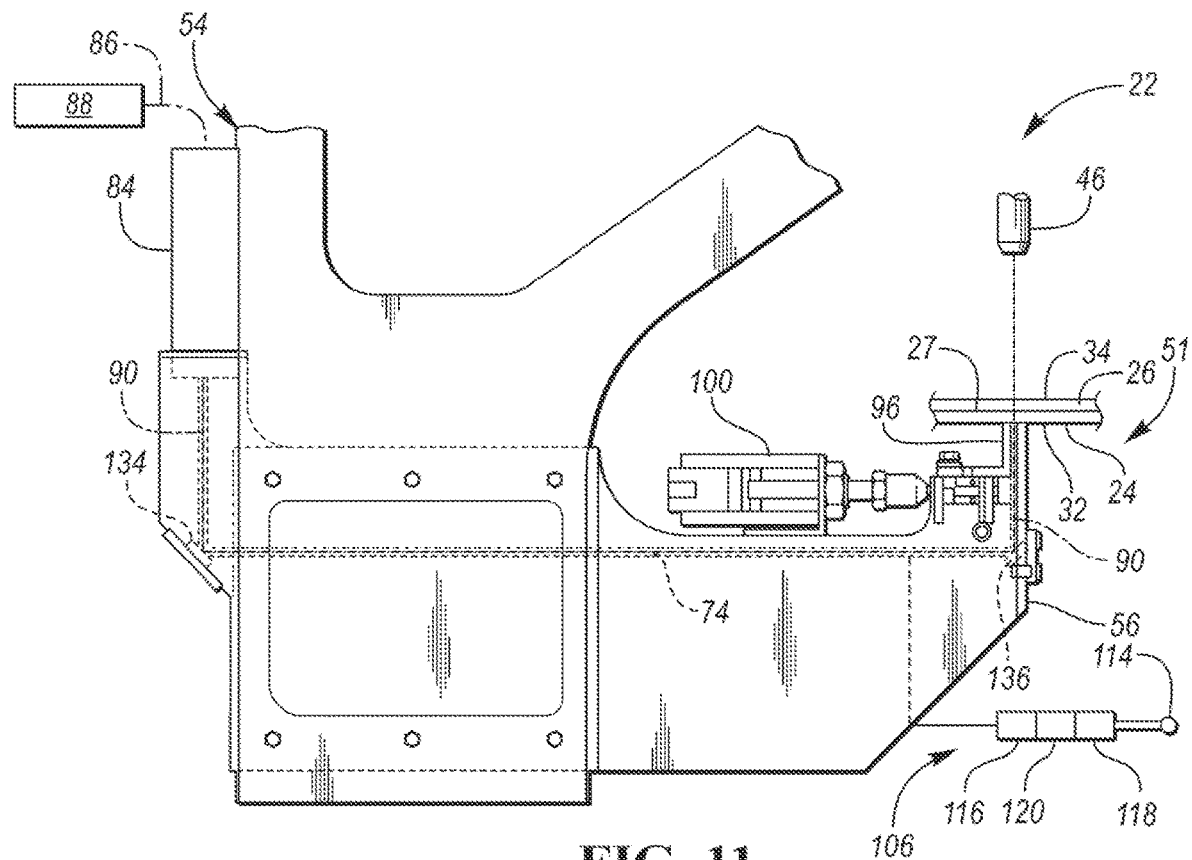
FIG. 11 is an enlarged view of a portion of FIG. 9 for further illustrating the construction of the joining assembly.
Figure 12:
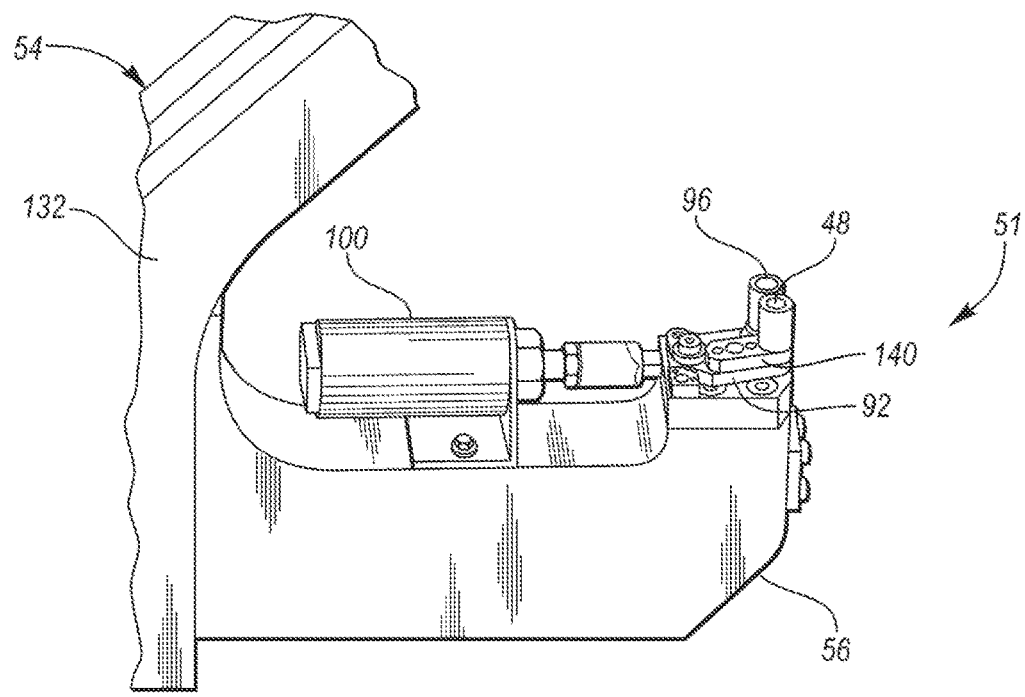
FIG. 12 is a perspective view of a portion of FIG. 9 to further illustrate the joining assembly of the apparatus.

In the embodiment of the apparatus 22 as illustrated in FIG. 9 the housing 132 providing the C frame 54 supports the laser collimator 84 and, as shown best in FIG. 11, has its laser beam 90 projecting toward a first mirror 134 within the light-safe chamber 74 defined by the housing. That first mirror 134 reflects the laser beam approximately 90 degrees toward a second mirror 136 for reflection approximately 90 degrees upwardly toward the indexing member 92 which functions generally the same as the previously described embodiment of FIGS. 2-5 by pivoting between its heating position and its joining positions. Extension and retraction of the piston connecting rod of actuator 100 in this embodiment pivots the indexing member 92 about pivotal connection 94 to move between the heating positon and the joining position.

With further reference to FIG. 9, the apparatus 22 includes a roller screw 138 that moves the clinch punch or rivet ram 46 vertically to provide the joining operation. Each of the embodiments of FIGS. 2-5 and 9-12 has its indexing member provided as best seen in FIG. 10 with a die insert 140 that is secured in any suitable manner such as by threaded fastening to the associated indexing member 92 to provide switching of the die 48 between different jobs or replacement as necessary.

During vehicle body assembly for which this invention has particular utility, the AHSS piece being joined will normally have a thickness of 0.7 to 2 millimeters. The heating temperature will depend on the metal thickness and will normally be to a temperature of 500 to 700° C. The heating time will normally be about one second and the indexing time will be about 0.1 to 0.3 of a second, and the time to perform the joining will be about 0.3 to 0.5 of a second and as previously mentioned the laser may be of a class IV or the like from which there is protection for human safety. Thus, even if operators are located within the enclosed work station 23 shown in FIG. 1, the operation will be laser-safe due to the containment of scattered radiation from the laser beam as described. Furthermore, the laser utilized may be a fiber laser with a wavelength of 1,064 microns or a diode laser with a wavelength of 980 microns or any suitable laser capable of performing the AHSS heating for mechanical joining. Also, during the laser heating and mechanical joining, any suitable but unshown clamping or the like may be used to position the sheet portions 28 and 30 as well as 32 and 34 with respect to each other and with respect to the associated apparatus.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for joining metal sheet plates, said method comprising:
   disposing a first sheet of advanced high strength steel on a surface;
   disposing a second sheet of metal on said first sheet of advanced high strength steel such that said second sheet of metal is overlapping said first sheet of advanced high strength steel;
   irradiating a laser beam at a predetermined inclination angle onto the first sheet of advanced high strength steel of the overlapped first and second metal sheet;
   engaging said second sheet of metal with a mechanical tool to join said first sheet of advanced high strength steel to said second sheet of metal at a mechanical interlock;
   cooling the mechanical interlock whereby the first sheet of advanced high strength steel has a ductility and plasticity within the interlock that is equivalent to the first sheet of advanced high strength steel outside of the mechanical interlock;
   disposing adjacent a joining assembly the first sheet of advanced high strength steel that is overlapped with the second sheet of metal at an interface of the first and second sheets, with the joining assembly including a housing having an opening and defining a light-safe chamber;
   irradiating the laser beam from within the housing chamber through the opening of the housing; and
   detecting light-safe contact of the first sheet to only then permit the irradiating of the laser beam.

2. The method as claimed in claim 1, wherein the method further comprises a step of clamping the second sheet of metal to said first sheet of advanced high strength steel using the mechanical tool.

3. The method as claimed in claim 2, wherein the step of clamping occurs simultaneously with the step of engaging.

4. The method as claimed in claim 1, wherein said laser beam is incident on a side opposite to the side from which the mechanical tool is driven into the said second sheet of metal and said first sheet of advanced high strength steel.

5. The method as claimed in claim 2 wherein the step of clamping occurs after said mechanical tool engages said second sheet of metal.

6. The method as claimed in claim 1, wherein said second sheet of metal comprises a dissimilar sheet of metal being joined.

7. The method as claimed in claim 1, wherein pressurized gas flow from the light-safe chamber is sensed to control firing of the laser beam.

8. The method as claimed in claim 1, wherein a temperature of the first sheet is sensed to control its heating.

9. A method for joining metal sheet plates, said method comprising:
   disposing adjacent a joining assembly the first sheet of advanced high strength steel that is overlapped with the second sheet of metal at an interface of the first and second sheets, with the joining assembly including an indexing member mounted on a housing for movement parallel to the interface of the first and second sheets between a heating position and a joining position, with the indexing member including an opening positioned in the heating position in alignment with the opening of the housing and in alignment with a joining location of the first and second sheets, and with the indexing member including a die that is located when the indexing member is in the joining position in alignment with the joining location of the sheet portions;
   irradiating the laser beam through the opening of the indexing member in its heating position to provide heating of the first sheet of advanced high strength steel at the joining location and after the heating moving the indexing member parallel to the interface of the first and second sheets to the joining position;
   operating a clinch punch or a rivet ram to cooperate with the die in the joining position of the indexing member to mechanically join the heated first sheet of advanced high strength steel and the second metal sheet to each other at the joining location;
   disposing a first sheet of advanced high strength steel on a surface;
   disposing a second sheet of metal on said first sheet of advanced high strength steel such that said second sheet of metal is overlapping said first sheet of advanced high strength steel;
   irradiating a laser beam at a predetermined inclination angle onto the first sheet of advanced high strength steel of the overlapped first and second metal sheet;
   engaging said second sheet of metal with a mechanical tool to join said first sheet of advanced high strength steel to said second sheet of metal at a mechanical interlock; and
   cooling the mechanical interlock whereby the first sheet of advanced high strength steel has a ductility and plasticity within the interlock that is equivalent to the first sheet of advanced high strength steel outside of the mechanical interlock.

10. The method as claimed in claim 9, wherein the indexing member is either pivotally moved or moved in rectilinear manner between the heating and joining positions.

11. The method as claimed in claim 9, wherein the joining provides a clinch joint; a clinch-rivet joint; a full-punch rivet joint; or a self-piercing rivet joint.

12. The method as claimed in claim 9, wherein a parallel kinematic machine (PKM) operated by a controller mounts and moves the clinch punch or the rivet ram that cooperates with the die to provide the joining that connects the first and second sheets to each other, and wherein the PKM is moved on rails that are perpendicular to each other.

13. The method as claimed in claim 9, wherein opposite ends of a C frame mount the joining assembly and the clinch punch or the rivet ram that provide a joining operation, and wherein the C frame is supported and moved by a robot.

14. An assembly with the mechanical interlock formed by the method of claim 1.

15. A method for mechanically joining advanced high strength steel comprising:
   positioning adjacent a joining assembly a first sheet portion of advanced high strength steel that is contacted with a second sheet portion of metal at an interface of the sheet portions, with the joining assembly including a housing having an opening and defining a light-safe chamber and the joining assembly also including an indexing member mounted on the housing for movement parallel to the interface of the sheet portions between a heating position and a joining position, with the indexing member including an opening positioned in the heating position in alignment with the opening of the housing and in alignment with a joining location of the first and second sheet portions, and with the indexing member including a die that is located when the indexing member is in the joining position in alignment with the joining location of the sheet portions;

firing a laser beam from within the housing chamber through the opening of the housing and the opening of the indexing member in its heating position to provide heating of the first sheet portion of advanced high strength steel at the joining location and after the heating moving the indexing member parallel to the interface of the first and second sheet portions to the joining position;

detecting light-safe contact of the first sheet portion with the indexing member while in the heating position to only then permit the firing of the laser beam;

operating a clinch punch or a rivet ram to cooperate with the die in the joining position of the indexing member to mechanically join the heated first sheet portion of advanced high strength steel and the second metal sheet portion to each other as a mechanical interlock at the joining location;

using a controller configured to control positioning of the joining assembly, firing of the light-safe laser beam, detection of the light-safe contact of the first sheet portion of advanced high strength steel with the indexing member, and operation of the clinch punch or the rivet ram; and cooling the mechanical interlock whereby the first sheet portion of advanced high strength steel has a ductility and plasticity within the interlock that is equivalent to the first sheet portion of advanced high strength steel outside of the mechanical interlock.

16. The method as claimed in claim 15, wherein the indexing member is either pivotally moved or moved in rectilinear manner between the heating and joining positions.

17. The method as claimed in claim 15, wherein the joining provides a clinch joint; a clinch-rivet joint; a full-punch rivet joint; or a self-piercing rivet joint.

18. The method as claimed in claim 15, wherein pressurized gas flow from the light-safe chamber is sensed to control firing of the laser beam.

19. An assembly with the mechanical interlock formed by the method of claim 15.

* * * * *